United States Patent
Kaukl et al.

(10) Patent No.: US 10,044,827 B1
(45) Date of Patent: Aug. 7, 2018

(54) TRIGGER-BASED SESSION SERVICE CACHE POPULATION

(71) Applicant: Amazon Technologies, Inc., Seattle, WA (US)

(72) Inventors: Christopher Vincent Kaukl, Sammamish, WA (US); Geoffrey Scott Pare, Seattle, WA (US); Mohanish Hemant Kulkarni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 539 days.

(21) Appl. No.: 14/540,975

(22) Filed: Nov. 13, 2014

(51) Int. Cl.
*G06F 15/167* (2006.01)
*H04L 29/08* (2006.01)
*H04L 12/24* (2006.01)

(52) U.S. Cl.
CPC .......... *H04L 67/2842* (2013.01); *H04L 41/50* (2013.01); *H04L 67/142* (2013.01)

(58) Field of Classification Search
None
See application file for complete search history.

(56) References Cited

U.S. PATENT DOCUMENTS

| | | | |
|---|---|---|---|
| 6,167,438 A | 12/2000 | Yates et al. | |
| 6,453,404 B1 | 9/2002 | Bereznyi et al. | |
| 7,103,714 B1 * | 9/2006 | Jacobs | G06F 17/30902 707/E17.12 |
| 7,937,477 B1 * | 5/2011 | Day | G06Q 20/401 709/227 |
| 8,219,752 B1 * | 7/2012 | Jenkins | G06F 12/0815 711/118 |
| 8,224,964 B1 | 7/2012 | Fredrickson et al. | |
| 8,234,348 B1 | 7/2012 | Tulchinsky et al. | |
| 9,369,332 B1 | 6/2016 | Smith et al. | |
| 9,373,093 B2 | 6/2016 | Schiebeler et al. | |
| 2002/0138551 A1 * | 9/2002 | Erickson | H04L 29/06 709/203 |
| 2007/0143344 A1 | 6/2007 | Luniewski et al. | |
| 2007/0208686 A1 * | 9/2007 | Gupta | H04L 67/2823 |
| 2008/0229024 A1 | 9/2008 | Plamondon | |
| 2011/0246518 A1 | 10/2011 | Mehrotra et al. | |
| 2012/0041970 A1 | 2/2012 | Ghosh et al. | |
| 2012/0191834 A1 | 7/2012 | Song | |
| 2012/0331228 A1 * | 12/2012 | Shatz | G06F 17/30902 711/118 |
| 2014/0304499 A1 * | 10/2014 | Gopinath | H04L 63/168 713/151 |
| 2015/0319261 A1 | 11/2015 | Lonas et al. | |

\* cited by examiner

*Primary Examiner* — Brian Whipple
*Assistant Examiner* — Anthony T Rotolo
(74) *Attorney, Agent, or Firm* — Davis Wright Tremaine LLP

(57) ABSTRACT

A method and apparatus for trigger-based cache population are disclosed. In the method and apparatus, a trigger for populating a session cache is detected and the session cache is populated with a plurality of aspects of data as a result of detecting the occurrence of the trigger. The plurality of aspects of the data are associated with a session established with a session service.

19 Claims, 12 Drawing Sheets

US 10,044,827 B1

TRIGGER-BASED SESSION SERVICE CACHE POPULATION

CROSS-REFERENCE TO RELATED APPLICATIONS

This application incorporates by reference for all purposes the full disclosure of co-pending U.S. patent application Ser. No. 14/540,942, filed concurrently herewith, entitled "SESSION SERVICE ASPECT-ORIENTED CACHE" and co-pending U.S. patent application Ser. No. 14/541,015, filed concurrently herewith, entitled "EVICTION OF DATA IN A SESSION SERVICE CACHE."

BACKGROUND

Consumer electronics devices, such as smartphones and tablets, among others, have become increasingly popular with users. The consumer electronics devices, which have their own operating systems, such as mobile operating systems, offer a variety of applications to users. Furthermore, manufacturers and operating system providers have established application stores (or appstores) that allows customers to browse and obtain for free or purchase pre-screened applications that are compatible with their devices' operating systems. The proliferation of electronics devices is driving device manufacturers and operating system providers to develop application stores that provide optimum functionality to users, whereby the application stores provide fast search functionality and improved application recommendations, among other features.

It is challenging to have a multi-faceted cache for supporting sessions established between a session service of an application store and user devices, whereby the multi-faceted cache stores different aspects of data that are customized views of the data available for retrieval by corresponding services. It is also challenging to ensure that populating the cache with data may be triggered based on a variety of conditions and that out-of-date data is evicted from the cache and replaced with current data.

BRIEF DESCRIPTION OF THE DRAWINGS

Various embodiments in accordance with the present disclosure will be described with reference to the drawings, in which.

DETAILED DESCRIPTION

Figure 1:
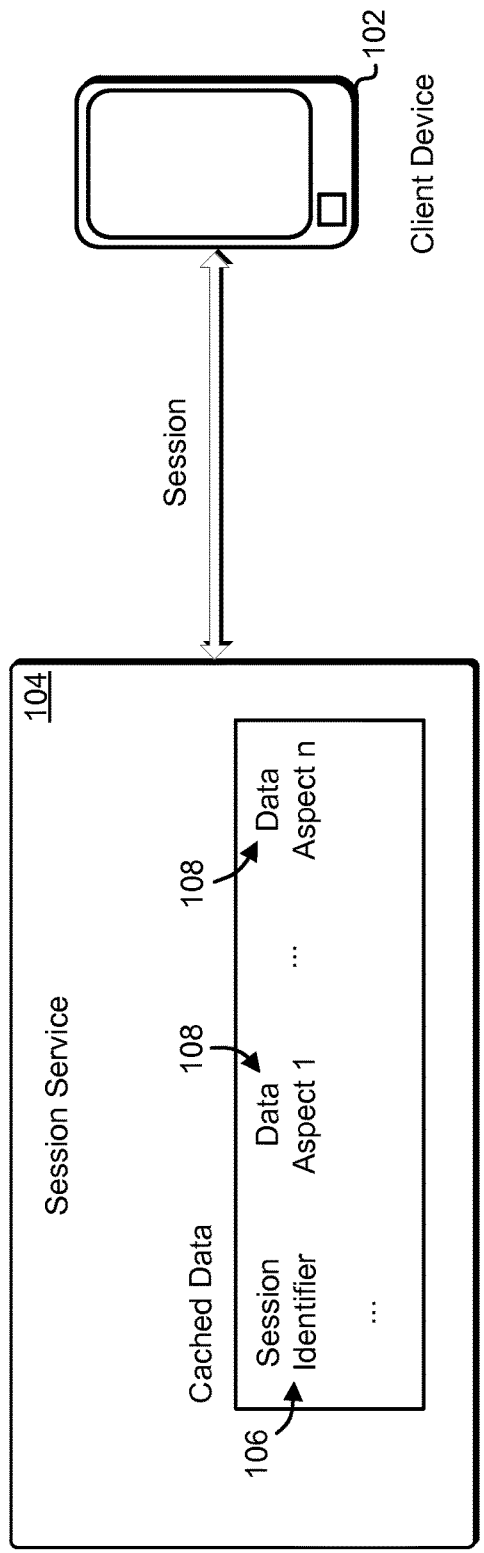
FIG. 1 shows an example of a session service caching a plurality of aspects of data in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include populating a session service cache with a plurality of aspects of data, whereby each aspect of the plurality of aspects is customized for access by a backend service of a plurality of backend services of the session service. An aspect of data may be a segment or a portion of data including data relevant to (for example, used by) a backend service of a plurality of backend services. The aspect of data may be customized for the backend service and may exclude cached data that is not used by or operated upon by the backend service. The session service cache may store the plurality of aspects of the data for each session maintained by the session service. The session may be a series of communications between the session service and the client device. The communications may include requests and responses made by the session service and the client device. The session may be used to give the client device access to a particular service. For example, the session may be used to give the client device access to an application store (colloquially known as an "appstore"). Using the session, the client device may access the application store and may be able to search for applications, receive information about the applications or download the applications.

The session service may include a plurality of backend services that support the session with the user device and are configured to provide an improved user experience to the user. The backend services may, for example, include a compatibility service that ensures that the session data provided to the user device is compatible with the user device. An ownership service may also be provided that is configured to determine, based at least in part on applications downloaded to the client device, offers for applications that are to be presented to the client device. Each of the backend services may access the session service cache to retrieve independent or distinct data. For example, the compatibility service may retrieve data associated with the client device hardware or operating system attributes, whereas the ownership service may access the session service cache to retrieve a list of applications download to the user device. To enable the plurality of backend services to support the session with the client device, the session service cache may store a plurality of aspects of data, whereby each aspect of data is customized for a backend service of the plurality of backend services.

A backend service may request the retrieval of data from the session service cache. The backend service may submit in connection with the request an identifier associated with a session. The session service cache may identify the backend service based at least in part on the request. Further, the session service cache may retrieve the aspect of data stored in the cache pertaining to the requesting backend service and provide the aspect of the data to the backend service. The provided aspect of data may be different than an aspect of data provided to a different backend service.

Populating the cache with data may be performed in response to a variety of triggers. Populating the cache may include creating an entry for a session in the cache and storing a plurality of aspects of data for the session. The triggers may include establishment of session with a client device or receipt, from the client device, of a request to establish a session. Furthermore, one or more conditions may be placed that if satisfied the session cache may be populated with a plurality of data aspects. The one or more conditions may be temporal conditions. For example, usage of the session service by client devices may peak at certain times of the day in geographic regions or time zones. The cache may be populated with aspects of data in anticipation of increased usage.

Following population of the cache with aspects of the data, the aspects of the data may be evicted from the cache. An aspect of the data may be evicted if one or more conditions are met. Furthermore, the conditions for eviction of an aspect of the data may be different than the conditions for eviction for another aspect. The conditions, which may include time-to-live conditions as described herein, may be evaluated periodically or according to a schedule. If the conditions corresponding to an aspect of the data are met then the aspect of the data may be evicted from the cache.

FIG. 1 shows an example of a session service caching a plurality of aspects of data in accordance with at least one embodiment. The session service 104 has an established session with the client device 102, which may be any type of consumer electronics device including a personal computer, smartphone or tablet among others. The session established between the session service 104 and the client device has a session identifier 106, which be used to distinguish the session from other sessions established by the session service 104. Data associated with the session may be cached in the session service 104. The cached data may be segmented into a plurality of aspects 108 (singularly referred to herein as aspect 108). Each aspect 108 may be a portion of data that is customized for a retrieving entity, which may be a backend service of the session service 104. Each aspect of the data may be accessed by a corresponding backend service, whereby the data may be used to enable the session maintained with the client device 102.

The plurality of aspects 108 may each be structured data sets with various sets of fields. Further each aspect 108 may be associated with a template that specifies the manner in which data associated with the aspect is populated. An aspect 108 may be structured or otherwise configured to be compatible with a receiving backend service as described herein. Some aspects may have data in common, whereas data of an aspect of the plurality of aspects 108 may be different than that of another aspect. The data of each aspect 108 may be stored separately, which may result in overlapping data being stored more than once. Alternatively, only non-overlapping data may be stored and appropriately tagged. Furthermore, a table or another data structure may be used to reference data pertaining to an aspect.

Figure 2:
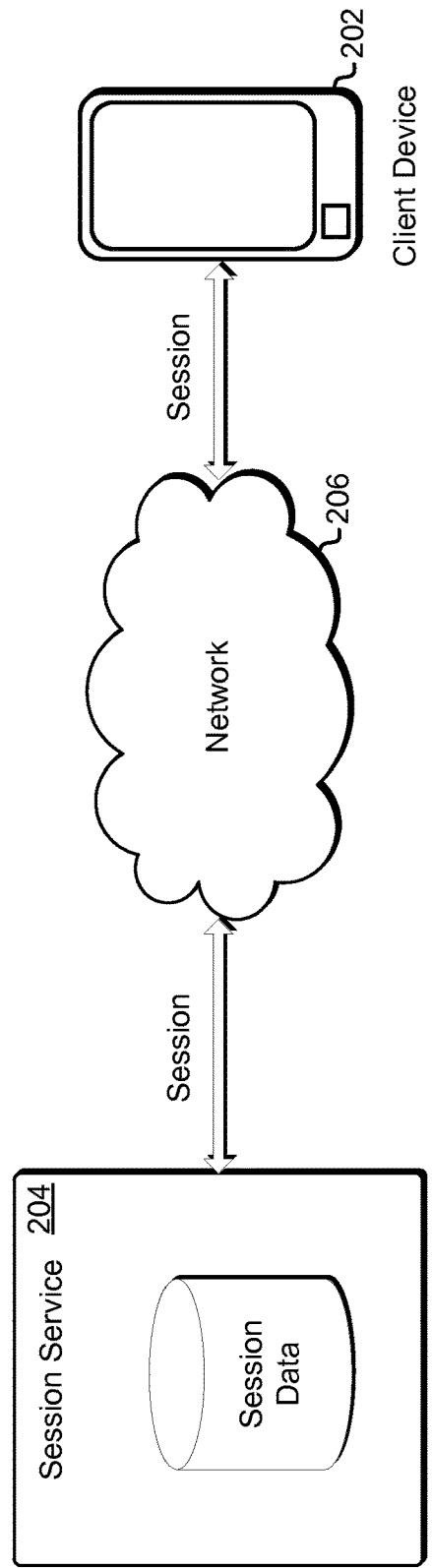
FIG. 2 shows an example of a client device having a session with a session service in accordance with at least one embodiment.

FIG. 2 shows an example of a client device having a session with a session service in accordance with at least one embodiment. The client device 202 may be any type of device that is capable of communicating with session service 204. The client device 202 may be a consumer electronics device, such as a tablet, smartphone, Internet-connected television or smart television or set-top box, among others. The client device 202 may be equipped with computational capability, such as that provided by a processor. The computational capability enables applications or an operating system to be executed on the client device 202. Furthermore, the client device 202 may be equipped with storage resources, such as a hard drive or a solid state drive, as well as memory resources, such as those provided by a static or dynamic random access memory (RAM). The client device 202 may further be equipped with networking resources, such a network card or a modem. The networking resources enable the client device 202 to communicate with the session service 204, whereby the communication may be over a network 206 as shown in FIG. 2. Furthermore, the network 206 may be any type of network, such as the Internet or an intranet.

The session service 204 may include one or more computing resources that are configured to support session establishment with the client device 204 and maintenance of the session with the client device 204. The computing resources of the session service 204 may include servers, storage devices or networking equipment, among others. The computing resources may be used to store data associated with the session, such session identifiers or client device capabilities. The session service 204 may make the data available to the client device or other entities, such as backend services described herein, for facilitating the session between with the client device 202.

The session may be any type of information exchange between the client device 202 and the session service 204 or other services (such as backend services) as described herein. The session may be established and terminated or "torn down" at a later point in time. The session may in some embodiments be stateful, whereby a party to the session stores information about the session or other communicating parties. The information may include device configuration, location, preferences or historical browsing information or "click stream" information, among others. Requests and responses exchanged between the client device 202 and the session service 206 may refer to the information retained by either party of a stateful session. Furthermore, the session may also be stateless, whereby the client device 202 and the session service 204 may have a session and requests and responses, such as application programming interface (API) configured function calls, may be exchanged between the client device 202 and the session service 204. The requests and responses may be made independent of information or data stored by either entity.

The session may be established between the client device 202 and the session service 204 in order to provide a service to the client device 202. For example, the session may be enable a user of the client device 204 to access an application store, whereby the user may search for applications and receive information about the applications (such as user reviews). Furthermore, the user may be presented with offers to download or purchase applications or may be presented with a list of popular applications. A session established between the client device 202 and the session service 204 for the purpose of providing an application store to a user of the client device 202 may include a plurality of message exchanges between the client device 202 and the session service 204. The message exchanges may include an initial request by the client device 202 to access the application store. The initial request may trigger establishment of the session having a unique identifier. Furthermore, message exchanges may provide attributes of the client device 202 to the session service 204, whereby the attributes may include hardware or software capabilities of the client device 202. The attributes may also include a location of the client device 202, among others.

It is noted that, in various embodiments, a session may be established with an intervening service that communicates with either the client device 202 or the session service 204. The intervening service may, for example, be a web server that is used to provide a web page to the client device 202, whereby the webpage may render an application store to the client device 202. As described herein, a session may be established with the client device 204 even if an intervening service is party to the session with the session service 204 and sends or receives data on behalf of the client device 202. For example, the session may terminate on one end with the session service and on another end with the client device, the intervening service or both the client device and the intervening service.

The session service 204 may store data associated with the session, whereby the data may be used for supporting the established session. Continuing with the example of use of the session to provide access to an application store, the stored data may be used to provide recommended applications to the client device 202 based at least in part on the purchase history of the user of client device 202 as well as other users of the session service 204. Furthermore, the data may be cached for expeditious retrieval by the session service 204. In addition, the cache may be multi-faceted, whereby various customized aspects or views of the data may be stored and may be made available for retrieval by backend services as described herein.

Figure 3:
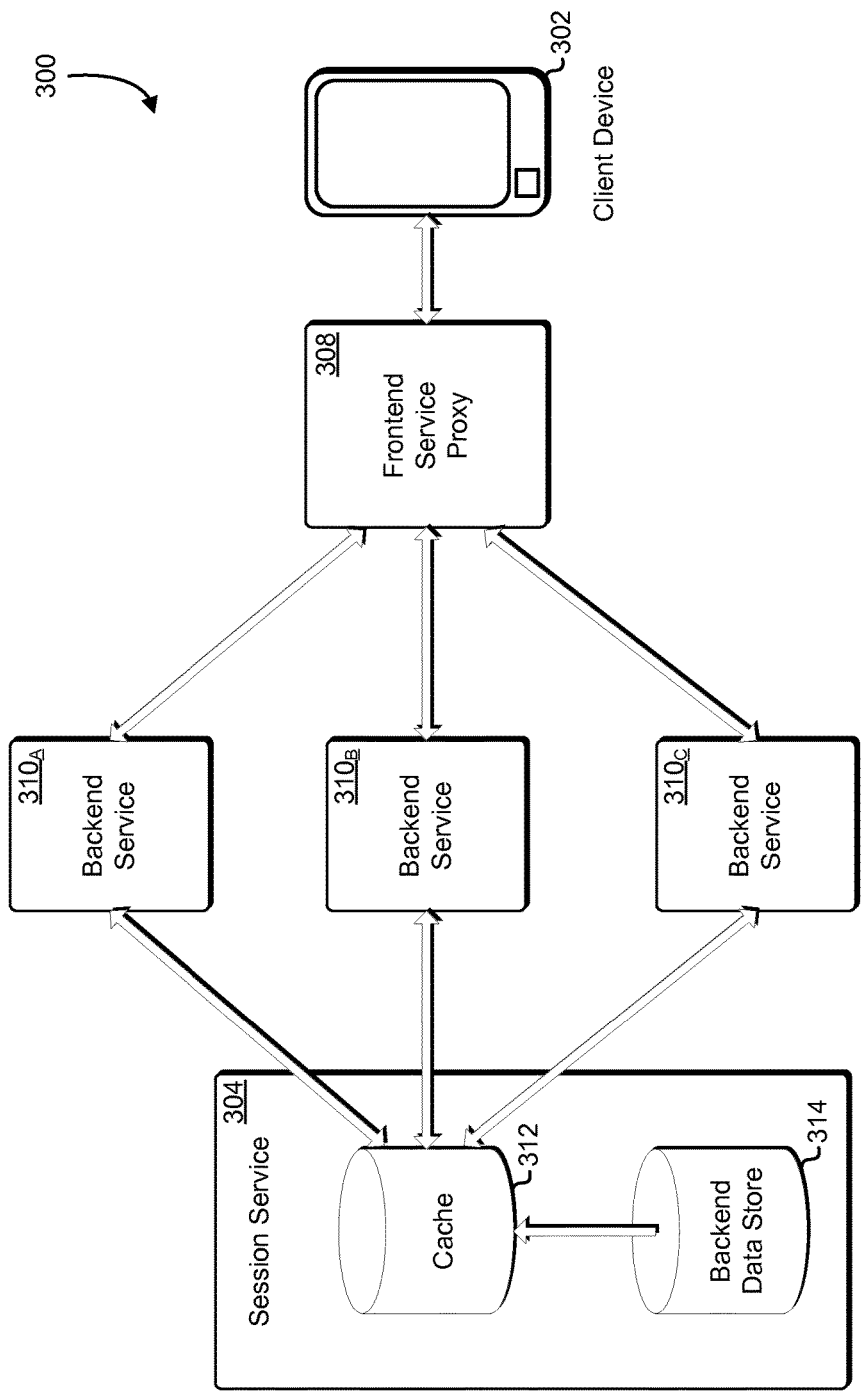
FIG. 3 shows an example of an environment for maintaining a session between a client device and a session service in accordance with at least one embodiment.

FIG. 3 shows an example of an environment for maintaining a session between a client device and a session service in accordance with at least one embodiment. In the environment 300, the client device 302, which may be similar to the client device 202 described with reference to FIG. 2, communicates with a frontend service proxy 308. The frontend service proxy 308 may be a server, such as a web server, and may be configured to communicate with the client device 202 over a network (not shown), whereby examples of the network include the Internet. The frontend service proxy 308 may route communications (for example, application programming interface (API) configured requests and responses) between the client device and the session service 304, whereby examples of the session service 304 include the session service 204 described with reference to FIG. 2. The communications may be routed via a plurality of backend services $310_{A-B}$ (singularly referred to herein by the numeral alone).

A session may be established between the client device 302 and the session service 304 in order to provide any type of service to the client device 302 or a user thereof. For example, the session may be established such that an application store (colloquially referred to as an "app store") may be provided on the client device 302 thereby enabling downloading an application to the client device 302. The application may be downloaded, for example, after purchase, and may be executed on the client device 302. The session may further be used to search of applications or receive recommendations based at least in part on behavioral data. The behavioral data may be purchase history, location information or demographic information, among others.

When a session is established between the client device 302 and the session service 304, the client device 302 may send information indicating its attributes to the frontend proxy service 308. The information may be device configuration including a type of the client device 302, identification of the client device 302, such as an international mobile subscriber identity (IMSI), or type or version of the operating system running on the client device 302. Furthermore, the information may include geographic information associated with the client device 302, such as a country or region in which the client device 302 is located. The attributes information may also include a list of applications that executed on the client device 302. The frontend proxy service 308 may evaluate the received information and may provide the received information or a portion thereof to the plurality of backend services 310.

The frontend proxy service 308 may distribute the attributes information to the plurality of backend services 310 such that a backend service receives a portion of the attributes information that is pertinent to its operation. A first backend service $310_A$ may, for example, be an ownership service. The ownership service may receive list of applications that are executed on the client device 302. The ownership service may, for example, use the list of applications to filter application offerings such that the client device 302 only receives offers to purchase applications that are not already installed on the client device 302. Similarly, a second backend service $310_B$ may, for example, be a discovery service. The discovery service may receive geographic information associated with the client device 302 or a user thereof. Using the geographic information, the discovery service may determine country- or region-dependent offers that may be made to a user. For example, some application may be available in certain countries but not others. The discovery service may use the geographic information to identify offers or other content, such as display content associated with an application store, that may be provided to the client device 302.

The information distributed to the plurality of backend services 310 may be stored in a cache 312 or backend data store 314 of the session service 304 or both the cache 312 and the backend data store 314. The backend data store 314 may be implemented using any type of data store, such as a hard drive or solid state drive. To enable efficient and expeditious access to the data stored by the backend data store 314, the data may be cached in the cache 312. The cache 312, which may be smaller in size that the backend data store 314, may be similarly implemented as the backend data store 314 and may enable faster retrieval of the data than the backend data store 314. When stored in the cache 312 or the backend data store 314, data associated with a backend service of the plurality of backend services 310 may be indexed using a session identifier. The session identifier may be used to distinguish the session that is maintained between the client device 302 and the session service 304 from other sessions including sessions that the session service 304 may have with other client devices that are different from the client device 302. Further, a backend service of the plurality of backend services 310 may have a unique view of the data pertaining to the session than other backend services. For example, of the data pertaining to the session, a backend service of the plurality of backend services 310 only view and retrieve data that is pertinent to its operation. The remainder of the data may not be viewed or retrieved by the backend service and may only be accessible by the backend service to which it pertains. A backend service may have one or more handlers, whereby a handler may be an application that is configured to request data from the cache 312. Data retrieved by more than one handler of a backend service may be combined and provided to other entities of the backend service for processing. Furthermore, a handler may be configured to performed operations on the data. For example, secretive or sensitive data may be encrypted as stored by the cache, and upon receipt of the encrypted data, a handler may decrypt the data for use by the backend service.

Figure 4:
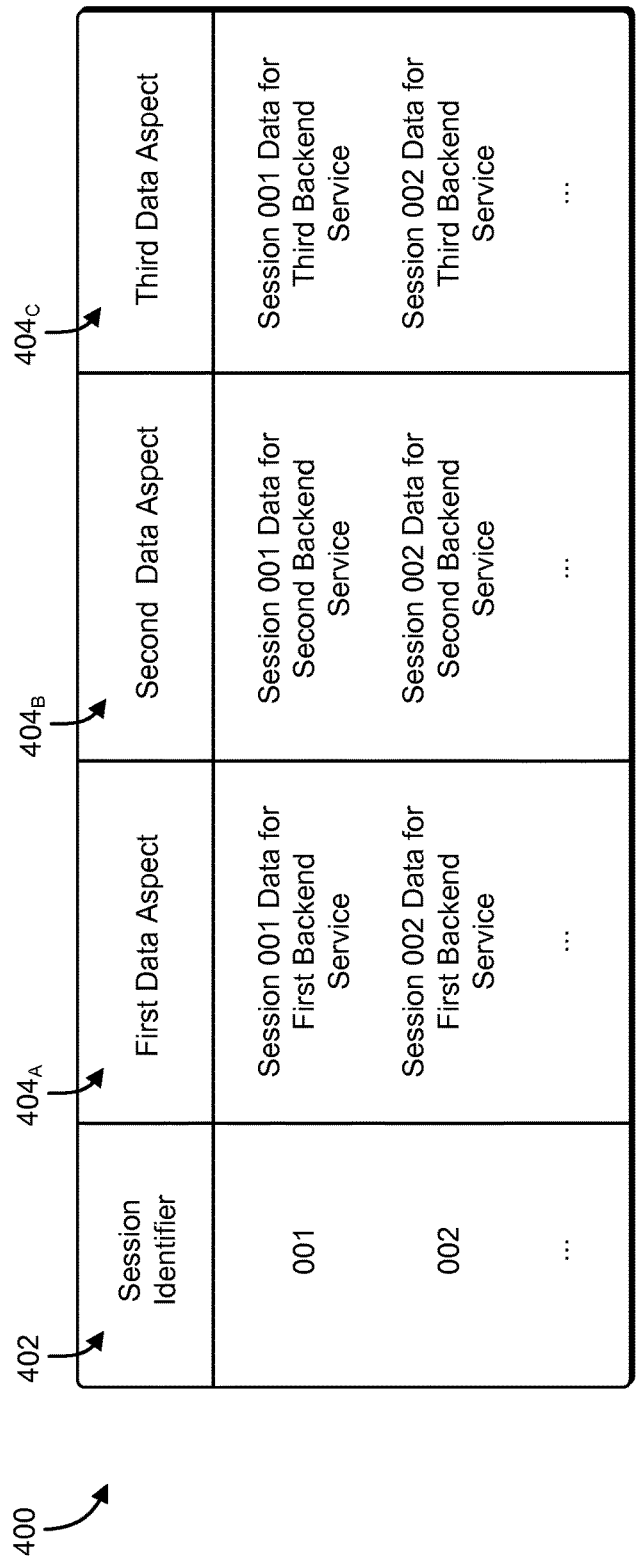
FIG. 4 shows an example of a session service cache having a plurality of aspects of data in accordance with at least one embodiment.

FIG. 4 shows an example of a session service cache having a plurality of aspects of data in accordance with at least one embodiment. The cache 400 stores a session identifier 402 and a plurality of data aspects $404_{A-C}$ (collectively referred to herein as aspects 404), whereby an aspect of the plurality of aspects 404 pertains to a backend service. Three aspects 404 are shown in FIG. 4 to include a first aspect $404_A$, a second aspect $404_B$ and a third aspect $404_C$. The session identifier 402 may uniquely identify each session that is supported by a session service, such as the session service 304 described with reference to FIG. 3. The session identifier 402 may include one or more alphanumeric characters, among others, and may be used to distinguish between sessions supported by the session service. A session may be supported by the session service if the session is established with the session service or if the session service is a party to communications pertaining to the session. It is noted that in various embodiments, sessions may have variable numbers of aspect 404 that are stored in the cache 400. For example, a first session may have data pertaining to all the aspects 404 of the cache 400, whereas a second session may only have data pertaining to some aspects of the cache 400 but not other aspects.

As described herein a plurality of backend services, such as the backend services 310 described with reference to FIG. 3, may each have access to an aspect of the cache 400 that includes data customized for the backend service. An aspect may generally include a portion of data that is customized for access by the backend service. An aspect may be customized by excluding data that is not relevant or not used by a backend service and only including data that is relevant to the backend service. Access by a backend service provides the backend service with the ability to retrieve the aspect of data from the cache 400 or write to the aspect of data by, for example, overwriting existing or already stored data. The aspect pertaining to a backend service may overlap with an aspect of the data of another backend service. Alternatively, the aspects pertaining to two backend services may be mutually exclusive without overlap, whereby data that is accessible to a first backend service may be different than data that is accessible to a second backend service. Usage of a plurality of aspects 404 facilitates anonymization, whereby a type or category of data may be excluded from an aspect of data pertaining to a backend service if the data is sought to be kept away from the backend service and not divulged to the backend service. For example, if a service does not use sensitive or secretive data, such as data including personally identifying information (PII), the sensitive or secretive data may be excluded from the aspect of data pertaining to the service and, thus, the data may not be provided to the service. Accordingly, usage of aspects of data facilitates secure vending of the data.

An aspect of data may be tagged accordingly. For example, the cache 400 shown in FIG. 4 stores data for each of the plurality of backend services, and data pertaining to each backend service may be tagged to identify the data as being retrievable by the backend service. A backend service may submit a request to the cache 400 to retrieve session data. The request may be an appropriately configured API function call. A session identifier may be submitted in connection with the request. For example, the session identifier may be included in the request or a field of the API function call may be used to provide the session identifier. Alternatively, the session identifier may be otherwise determinable by the cache 400 or the session service from the request. The cache 400 or the session service may also be configured to identify the backend service submitting the request. The identification may be based at least in part on the request. For example, the request may include an identification of the backend service making the request. Further, the backend service may be identified based at least in part on a host address (such as an Internet protocol (IP) address) or a network address of the backend service provided in connection with the request. Upon identifying the session for which data is requested and the backend service seeking access to the data, the cache 400 may identify data that satisfies the request based at least in part on the session identifier and the identity of the backend service. For example, a database table may be queried for identifying a tag associated with the requested data. The tag may be used to retrieve the requested data, and the requested data may be provided to the backend service.

In an embodiment, an aspect 404 of the data stored by the cache may be associated with a version number in place of a session identifier. For example, instead of identifying the session established with the session service by a session identifier, a client device may be associated with a version number. The version number may be the version of an operating system executed on the client device, among others. Aspects of the data stored in the cache may be associated with the version number in place of the session identifier. Furthermore, the cache may store different versions for each aspect of the data. The different versions of an aspect may correspond to a session or a version number of a client device, among others.

Figure 5:
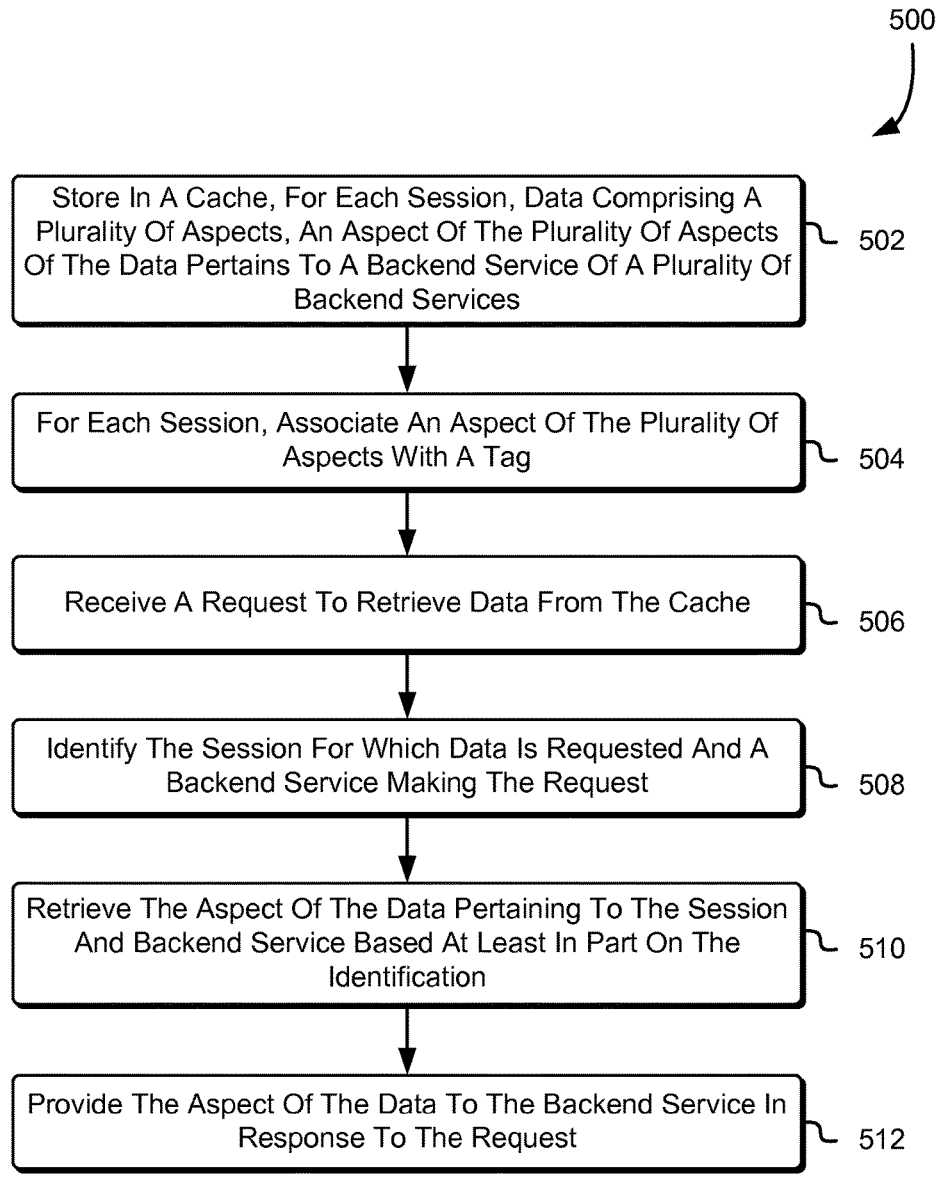
FIG. 5 shows an example of a method for retrieval of data having a plurality of aspects from a cache in accordance with at least one embodiment.

FIG. 5 shows an example of a method for retrieval of data having a plurality of aspects from a cache in accordance with at least one embodiment. In the process 500, a cache, such as the cache 400 described with reference to FIG. 4, stores 502 for each session data comprising a plurality of aspects. An aspect of the plurality of aspects of the data pertains to a backend service of a plurality of backend services. The session may be any type of communication between a session service, such as the session service 304 described with reference to FIG. 3, and a client device. The cache may be used by the session service to store data used to enable the session. For example, the data may be used to improve a user experience in purchasing and receiving recommendations when accessing an appstore.

An aspect of the data (also referred to as a view of the data) may be a portion, segment or partition of the data that is relevant for a backend service, whereby the backend service may be configured to use the portion of the data to support the session or improve features thereof. An aspect of the data that is relevant for one backend service may not be relevant for another session, and a backend service may only be provided with a data aspect that is relevant to or usable by the backend service. The cache associates 504, for each session, an aspect of the plurality of aspects with a tag, whereby the tag may be used to locate and retrieve the aspect.

The cache then receives 506 a request to retrieve data from the cache. The request may be an API-configured function call and may originate from a backend service for which the cache retains an aspect of the data. The cache identifies 508 a session for which data is requested and a backend service making the request. The identification may be based at least in part on the request. For example, the request may include a session identity. Furthermore, the request may include an identity of the backend service making the request or an address of the backend service may be determined from the request. The cache retrieves 510 the aspect of the data pertaining to the session and backend service based at least in part on the identification. For example, a database may be used to associate a session identifier and backend service identity with a tag used to mark a data aspect pertaining to the session and backend service, and the tag may be used to retrieve the data aspect. After retrieving the aspect of the data, the cache then provides 512 the aspect of the data to the backend service in response to the request.

Figure 6:
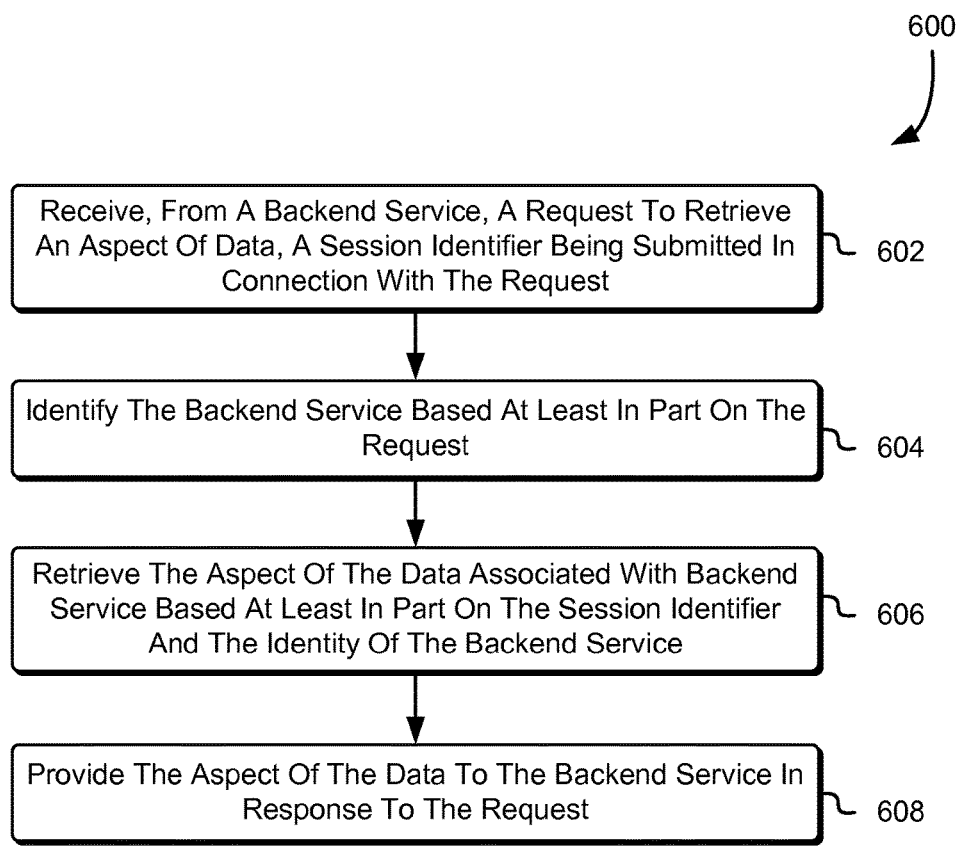
FIG. 6 shows an example of a method for retrieving an aspect of data from a cache in accordance with at least one embodiment.

FIG. 6 shows an example of a method for retrieving an aspect of data from a cache in accordance with at least one embodiment. In the process 600, a cache, such as the cache 400 described with reference to FIG. 4, receives 602 a request to retrieve an aspect of data from a backend service, whereby a session identifier to which the data pertains is submitted in connection with the request. The cache may store a plurality of aspects of data for each session. The cache then identifies 604 the backend service submitting the request based at least in part on the request. For example, the backend service may be identified in the request or an address of the backend service may be determined from the request and an aspect of the data corresponding to the backend service may be retrieved. Further, a field, flag or parameter of the request may specify the aspect (using an identifier of the aspect). The request may be an application programming interface function call. Furthermore, a plurality of backend services may make the same request to retrieve their respective aspect of the data from the cache. Although the cache receives the same request from different backend services, the cache may provide each backend service with a unique aspect of the data pertaining to the backend service in response to the request. Identifying the backend service facilitates providing the unique aspect to each backend service in response to similarly configured requests.

The cache then retrieves 606 the aspect of the data associated with backend service based at least in part on the session identifier and the identity of the backend service. As described herein, aspects of data that are stored by the cache may be tagged, whereby a tag may be used to link the aspect of the data to both a session and a backend service. Following retrieval of the data, the cache provides 608 the aspect of the data to the backend service in response to the request.

Figure 7:
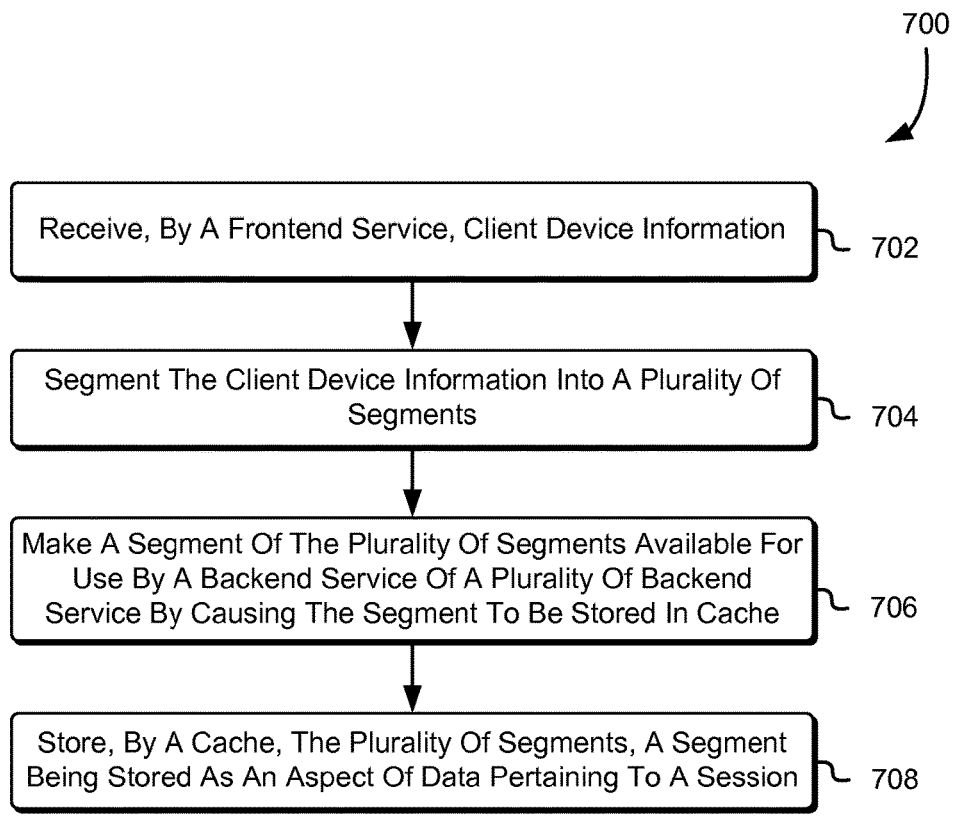
FIG. 7 shows an example of cache population in accordance with at least one embodiment.

FIG. 7 shows an example of cache population in accordance with at least one embodiment. In the process 700, a front end service, such as the frontend service 308 described with reference to FIG. 3, receives 702 client device information. The client device information may be received from a client device, such as the client device 302 described with reference to FIG. 3. The client device information may include attributes of the client devices such as hardware capabilities of the client device or a list of applications executed on the client device. Furthermore, the attributes may include identifiers of the client device, such as an IP address or an IMSI. In addition or as an alternative to client device information, the frontend service may also receive secondary information. The secondary information may be any type of data that is identified or retrieved based at least in part on the client device information. For example, the secondary information may include graphics data for an application store that is customized for or optimal for the client device. The secondary information may be identified or retrieved based at least in part on the one or more client device attributes specified by the client device information. As with the client device information, the secondary information may also be segmented and stored in various aspects of a cache as described herein. Furthermore, the secondary information may be stored as part of the same or a different aspect of the data than the portion of the client device information used to identify the secondary information.

The frontend service then segments 704 the client device information into a plurality of segments. A segment of the plurality of segments being made available for use by a backend service of a plurality of backend service, and each segment may include a portion of the client device information that is relevant to the operation of the backend service. Data that is part of the client device information and that is identified, for example, based at least in part on an associated type, as being needed or required for the operation of a backend service may be included in a data segment for the backend service. The frontend service then makes 706 the segment of the plurality of segments available for use by a backend service of a plurality of backend service by causing the segment to be stored in cache. The segment may be provided to the cache used by the backend service to store data, whereby examples of the cache include the cache 312 described with reference to FIG. 3. The cache then stores 708 the plurality of segments. Each segment may be stored by the cache as an aspect of data pertaining to a session. As described herein, the cache may store a plurality of aspects for data associated with a session identifier, and an aspect may be available for retrieval by an associated backend service. Segmented data that is associated with a backend service may be stored as part of the aspect pertaining to the backend service.

In various embodiments, attributes of the client device may be updated or changed. The change or update may necessitate an update or change to the client device information, and the updated or changed client device information may be provided to the frontend proxy service for propagation to the cache, whereby one or more aspect of the plurality of aspects of data may be updated accordingly. To ensure that the client device information stored in aspects of the cache conform to those of the client device, the client device information maintained by the client device and that retained in the cache may be compared. To efficiently perform the comparison, the client device may apply a hash function to its client device information to produce a hash value and the hash value may be provided to the frontend proxy service. The frontend proxy service may, in turn, apply the same hash function to its copy of the client device information, whereby the copy may be stored in the cache. The resulting hash value may be compared to the received hash value and if the has values correspond to one another (for example, match) it may be determined that the frontend proxy has an up-to-date copy of the client device information. Conversely, if the hash values do not correspond to one another, then the client device information that was received by the frontend proxy may be determined to be out-of-date or "stale", and the client device may send the updated client device information to the frontend proxy service. It is noted that the comparison may alternatively be performed by the client device. Furthermore, use of hash values may be done for bandwidth efficiency, and in alternative embodiment, the client device information may be provided to the frontend proxy service for comparison.

Figure 8:
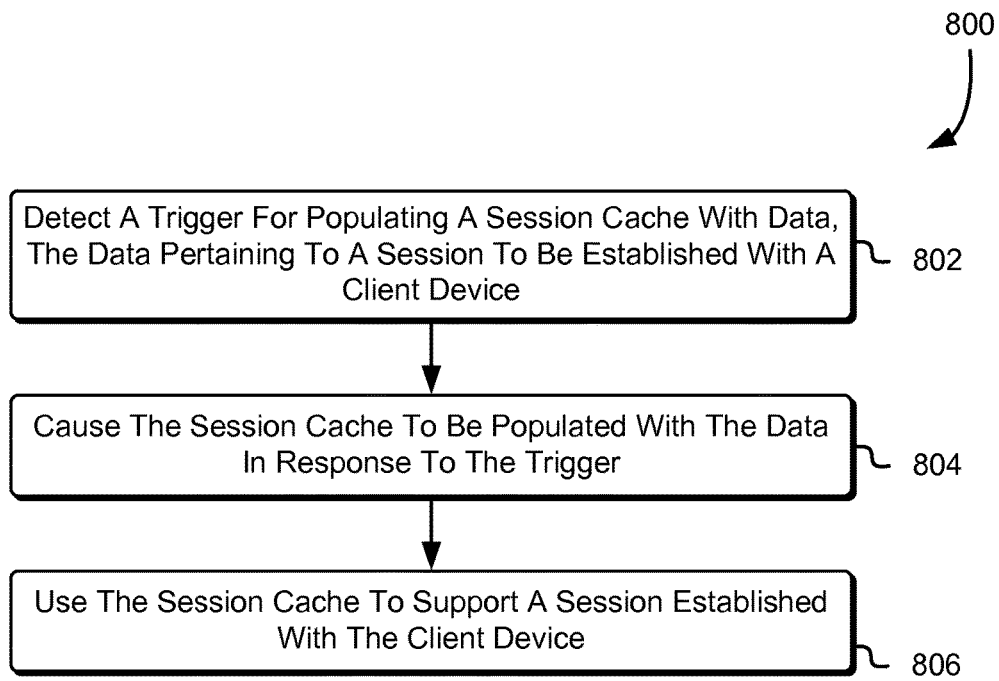
FIG. 8 shows an example of a method for populating a session cache in accordance with at least one embodiment.

FIG. 8 shows an example of a method for populating a session cache in accordance with at least one embodiment. In the process 800, a session service, such as the session service 304 described with reference to FIG. 3, detects 802 a trigger for populating a session cache with data. The session service may have an associated session cache used for storing data that enables establishment of a session with the client device or maintaining the session with the client device. The trigger may, for example, be receipt of a request for session establishment from the client device or a cache miss. Furthermore, the trigger may be a temporal trigger. For example, the session service may be used to provide session to client devices of users in various geographic regions. Establishment of the sessions may peak during a certain time of the day. In anticipation of a peak in usage of the session service, the cache associated with the session service may be populated with data used to support the sessions. For example, it may be determined that peak usage of the session service occurs at noon in various time zones, and the cache may be populated with data in anticipation of increased usage of the session service.

The trigger may in various embodiments be a non-temporal trigger. For example, the trigger may be a change to one or more rules used to populate the cache. If business rules that dictate cache population change, the cache may be preemptively populated as a result of the change to the rules, and the change to the rules may trigger cache population. Further, various events may trigger the population of the cache. Continuing with the example of the cache being used for sessions of an application store, sales or other offerings that are expected to result in an increase in user requests may trigger cache population. Furthermore, the cache may be populated based at least in part on an analysis of requests received by the session service or generally data traffic of the session service.

The session service then causes 804 the session cache to be populated with the data in response to the trigger. For example, if the session created with the session service provides client device with access to an application store, the session cache may be populated with particular offerings to be presented to users in geographic regions based at least in part on detecting that the peak usage time of the geographic regions are approaching. Furthermore, taxes on purchased applications or other products, which are dependent on the location of the buyer, may be pre-calculated and cached ahead of the peak usage time. The session service then uses 806 the session cache to support a session established with the client device.

Figure 9:
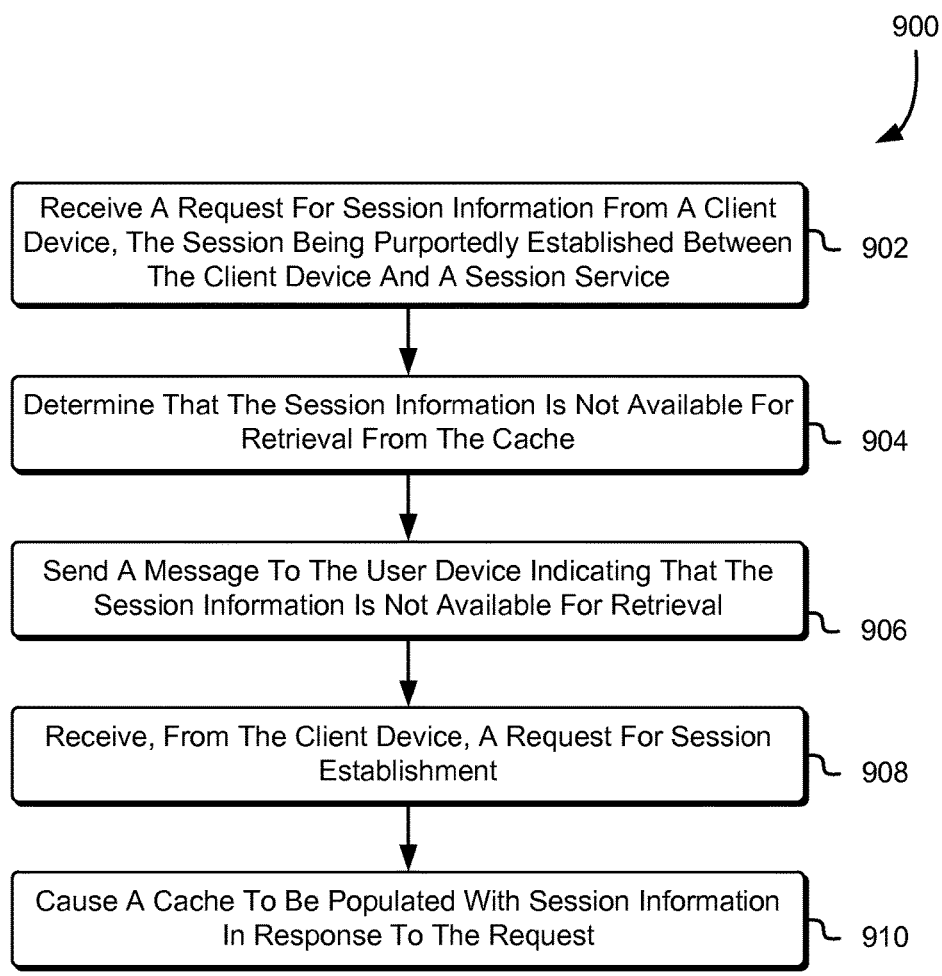
FIG. 9 shows an example of a method for triggering populating a session cache with data in accordance with at least one embodiment.

FIG. 9 shows an example of a method for triggering populating a session cache with data in accordance with at least one embodiment. In the process 900, a session service, such as the session service 304 described with reference to FIG. 3, receives 902 a request for session information from a client device, whereby the session may be purportedly established with a session service. The session may be identified as established between the client device and the session service. The session service may not have a record of a session with the client device. For example, that session may have "timed-out" or the session service may have removed data pertaining to the session from its cache. The session may have been established to enable the user device to access an application store, and a user of the client device may have ceased interacting with the application store. Furthermore, the data may have been evicted so that the cache may be used to store data associated with another session or the cache may have been "flushed".

The session service determines 904 that the session information is not available for retrieval from the cache. Further, the session service sends 906 a message to the user device indicating that the session information is not available for retrieval. For example, that message may be a "no such session" exception and may indicate that the session service does not have a record of the session with the client device. The client device may be configured to request establishment following receipt of the message so that the session may be re-established with the session service. The session service may, accordingly, receive 908, from the client device, a request for session establishment. The request may be a trigger to create an entry associated with the session in the session service cache. The session service then causes 910 a cache with session information in response to the request. As described herein, the cache may store a plurality of aspects of data associated with the session, whereby each aspect of the data may be used by a backend service of a plurality of backend services maintaining the session with the client device. It is noted that in various embodiments, the re-established session may have the same session identifier as the session previously established with the client device.

A multi-faceted cache, such as the cache 312 described with reference to FIG. 3, may associate each aspect of data of a session with a different time-to-live (TTL) measure. For example, a first aspect of the data may be known to become out-of-date or "stale" more quickly than a second aspect of the data and may, accordingly, be associated with a shorter time-to-live measure than the second aspect. Having different time-to-live measures of various aspects of data for the same session results in the various aspects of the data being evicted from the cache at different time. Furthermore, because an evicted aspect of the data is typically replaced upon eviction, the various aspects of the data may be replaced at different times as well. Different aspects of the data may be associated with different time-to-live measures due at least in part to the type of data stored in the aspect of the cache. For example, if an aspect is used to store data that specified the hardware capabilities of the client device, then the aspect may be associated with a relatively long time-to-live measure because the hardware capabilities of the client device may not be expected to change during the course of the session with the session service. However, if the aspect of the cache is used to retain information about the number of list of applications downloaded to the client device, then the time-to-live measure may be relatively short because it is expected that a user may download an application to the client device during the course of the session. A short time-to-live measure ensures that the data stored is replaced more frequently and is more likely to remain current.

Figure 10:
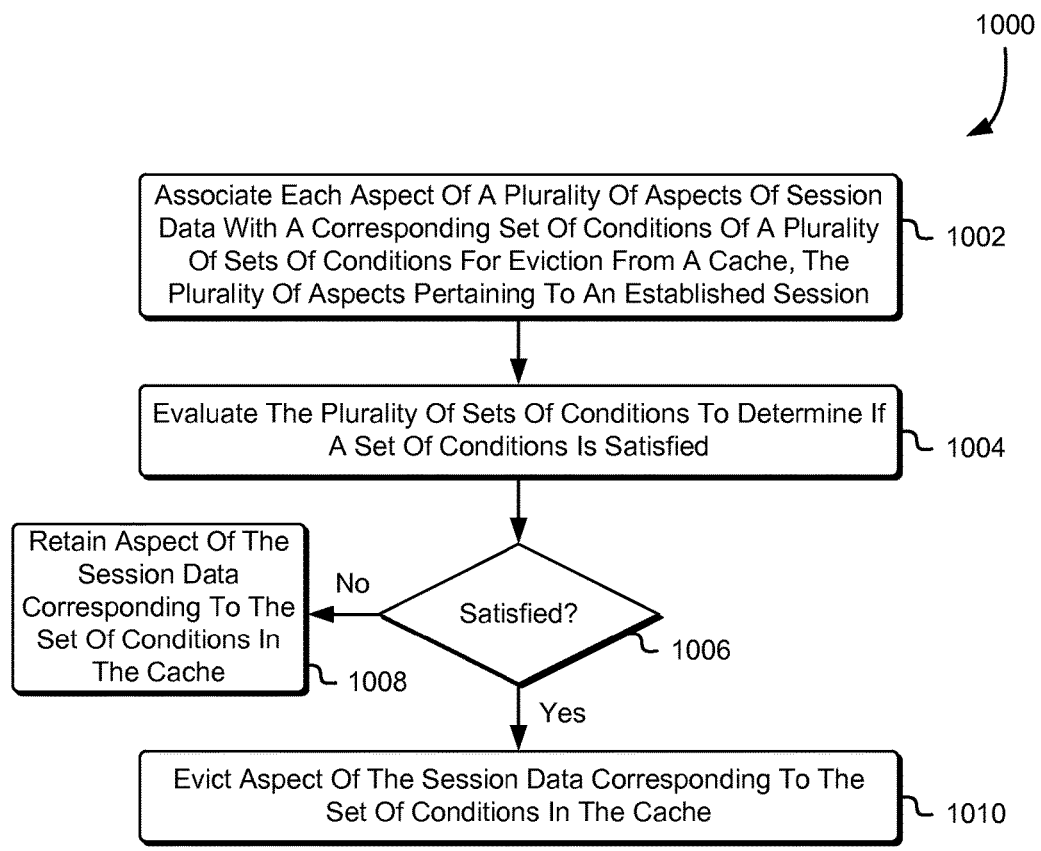
FIG. 10 shows an example of a method for evicting data from a session cache in accordance with at least one embodiment.

FIG. 10 shows an example of a method for evicting data from a session cache in accordance with at least one embodiment. In the process 1000, a cache, such as the cache 312 described with reference to FIG. 3, associates 1102 each aspect of a plurality of aspects of session data with a corresponding set of conditions of a plurality of sets of conditions for eviction from the cache. The plurality of aspects may pertain to an established session of a session service, such as the session service 304 described with reference to FIG. 3. The set of conditions may include a time-to-live measure that specifies a length of time the aspect of the data is to be retained in the cache. For example, a timestamp may be taken that reflects the time the aspect of data was inserted for storage in the cache, and a time-to-live measure dictating the amount of time the aspect of the data is to be retained in the cache before eviction may be set. If the aspect of the data is replaced, the timestamp may be refreshed to reflect a new insertion time.

The cache evaluates 1004 the plurality of sets of conditions to determine if a set of conditions is satisfied. The evaluation may be performed periodically or according to an aperiodic time schedule. If the condition it a time-to-live measure, the evaluation may include determining whether the time-to-live measure has expired, whereby the time-to-live measure may be deemed to have expired if the time elapsed from the timestamp is greater than the time-to-live measure. If it is determined 1006 that a set of conditions of the plurality of sets of conditions is not satisfied, the aspect of the session data corresponding to the evaluated set of conditions is retained 1008 in the cache. Conversely, it is determined 1006 that the set of conditions of the plurality of sets of conditions is satisfied, the aspect of the session data corresponding to the evaluated set of conditions is evicted 1010 from the cache, whereby following eviction, the aspect of the data may be replaced with renewed data.

Figure 11:
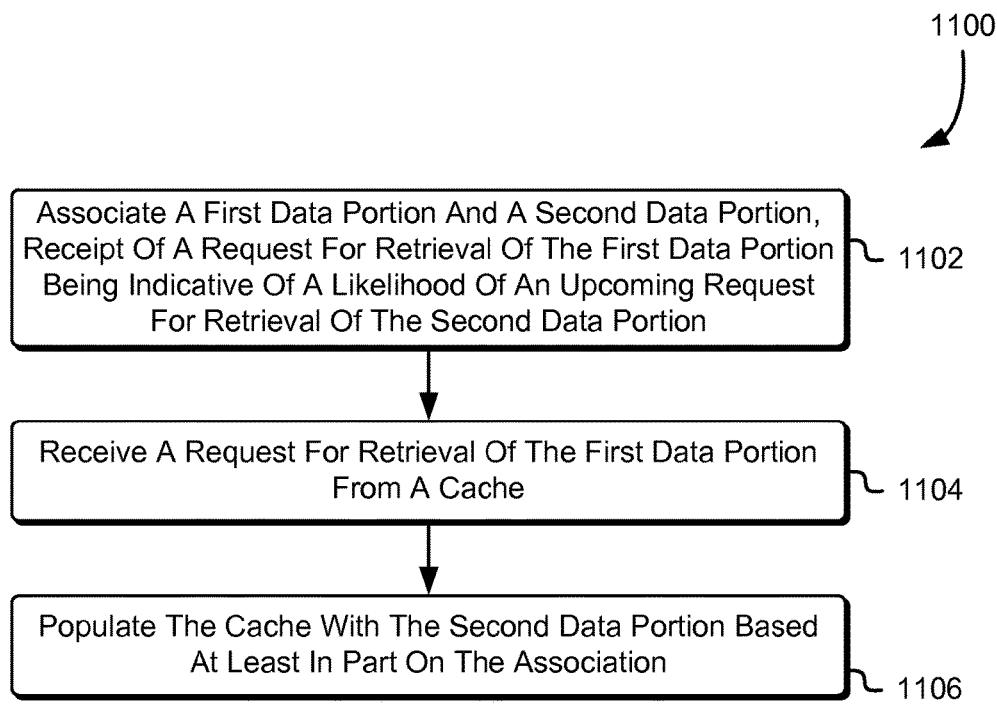
FIG. 11 shows an example of a method for populating a session cache in accordance with at least one embodiment.

FIG. 11 shows an example of a method for populating a session cache in accordance with at least one embodiment. In the process 1100, a cache, such as the cache 312 described with reference to FIG. 3, associates 1102 a first data portion and a second data portion, whereby receipt of a request for retrieval of the first data portion is indicative of a likelihood of an upcoming request for retrieval of the second data portion. The association of the first data portion and the second data portion may be based at least in part on historical observations, whereby it may be determined that the data portions are frequently requested within a time period of one another. Furthermore, either the first or second data portion may be an aspect of data stored in the cache. For example, it may be observed that when a user of a client device searches for an application to download to the client device, the applicable taxes on the purchase of the application are frequently subsequently requested. Accordingly, the cache may be pre-populated with the calculated tax amount following receipt of a request to obtain information about the application.

The cache receives 1004 a request for retrieval of the first data portion. The request for retrieval of the first data portion may prompt populating the cache with the second data portion such that if the second data portion is requested it may be expeditiously provided by the cache. The cache is then populated 1106 with the second data portion based at least in part on the association. The cache may be configured to probabilistically determine that certain types of requests for data are likely to be followed by other types of requests and, as a result, "cache warming" may be performed. For example, the cache or the session service may observe that navigation of a certain webpage is followed by a request for credit card information and may determine a conditional probability associated with the event. If the conditional probability exceeds a threshold or is within a range, a request for navigation of the webpage may trigger populating the cache with associated credit card information.

Figure 12:
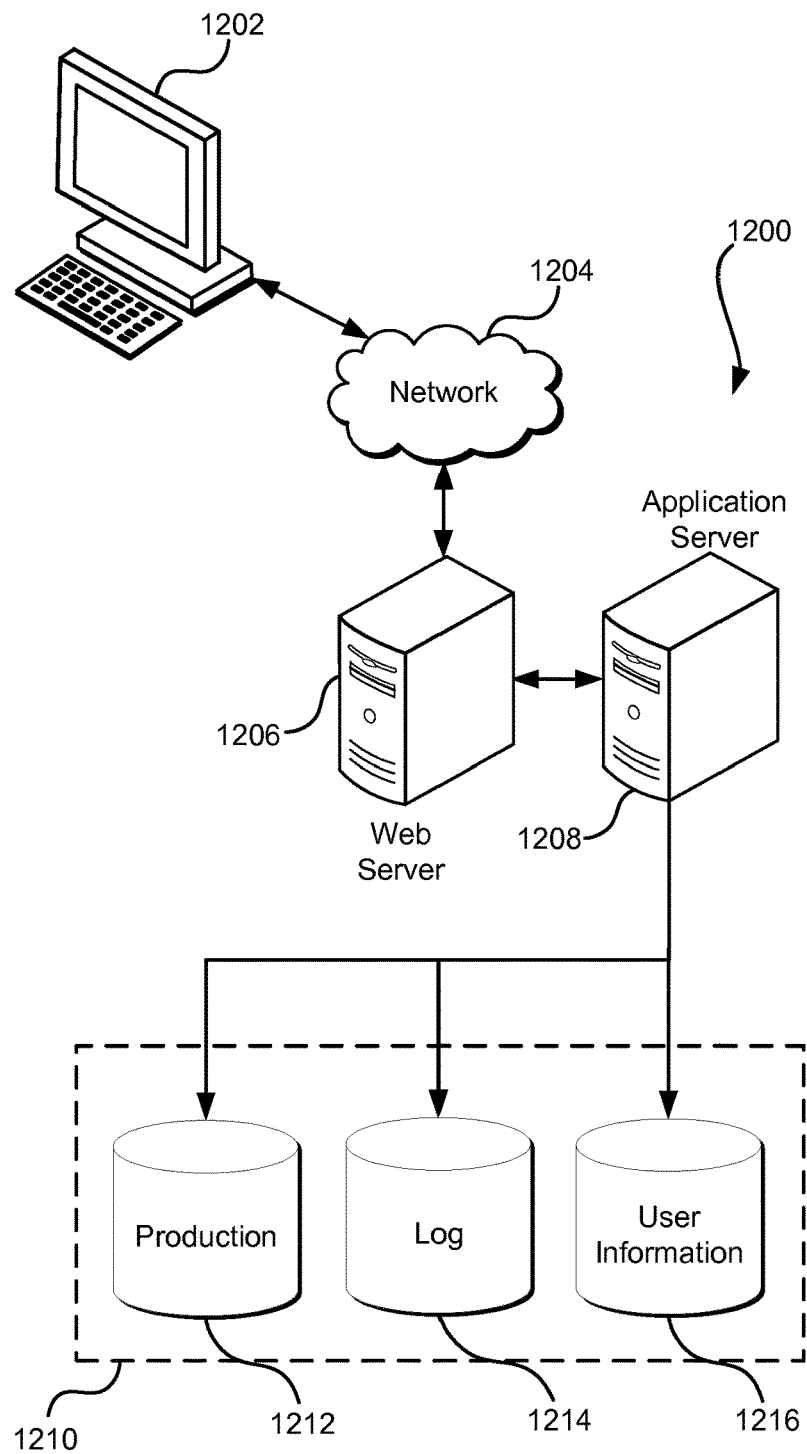
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for trigger-based cache population, comprising:
receive, from a client device, a request for information associated with a session, the request including a session identifier, the session being purportedly established between the client device and a session service;
send an indication to the client device that the information associated with the session is not available for retrieval;
receive, from the client device, a request for session creation, one or more attributes of the client device being submitted in connection with the request for session creation; and
in response to the request, store, in a cache, a plurality of aspects of data for the session, an aspect of the plurality of aspects of the data being a data set and including at least a portion of the one or more attributes of the client device, the aspect of the plurality of aspects of the data being customized for and retrievable by a backend service of a plurality of backend services of the session service, wherein a first aspect of the plurality of aspects provided in response to a request for data by a first backend service of the plurality of backend services is different from a second aspect of the plurality of aspects provided in response to the same request for data by a second backend service of the plurality of backend services.

2. The computer-implemented method of claim 1, wherein the one or more attributes of the client device include hardware capabilities of the client device.

3. The computer-implemented method of claim 1, further comprising:
receiving updated client device attributes; and
updating the plurality of aspects of the data based at least in part on the updated client device attributes.

4. A system, comprising at least one computing device configured to implement one or more services, wherein the one or more services:
detect occurrence of a trigger, the trigger being receipt of a request for session establishment;
populate a cache with a plurality of aspects of data as a result of the occurrence of the trigger, an aspect of the plurality of aspects of the data customized for a corresponding backend service of a plurality of backend services of a session service, the plurality of aspects of the data pertaining to a session established with the session service, wherein a first aspect of the plurality of aspects provided in response to a request for data by a first backend service of the plurality of backend services is different from a second aspect of the plurality of aspects provided in response to the same request for data by a second backend service of the plurality of backend services; and
enable the backend service of the plurality of backend services of the session service to access the corresponding aspect of the plurality of aspects of the data.

5. The system of claim 4, wherein the request for session establishment is received from an intervening service in communication with a client device, the client device being party to the session established with the session service.

6. The system of claim 4, wherein the one or more services are further configured to receive a request for session information prior to receiving the request for session establishment.

7. The system of claim 6, wherein the one or more services are further configured to:
identify that the session information is not available for retrieval; and
send an indication that the session information is not available for retrieval.

8. The system of claim 7, wherein the indication is sent to a client device that is party to the session established with the session service or an intervening service in communication with the client device.

9. The system of claim 8, wherein the client device or the intervening service is configured to request the session establishment as a result of receiving the indication.

10. The system of claim 4, wherein the one or more services that are configured to populate the cache with the plurality of aspects of the data are further configured to populate the cache with one or more attributes of a client device that is party to the session established with the session service.

11. The system of claim 4, wherein the one or more services that are configured to enable the backend service of the plurality of backend services of the session service to access the corresponding aspect of the plurality of aspects of data are further configured to:
receive a request for data from the backend service; and
provide the aspect of the plurality of aspects corresponding to the backend service in response to the request.

12. A non-transitory computer-readable storage medium having stored thereon executable instructions that, as a result of execution by one or more processors of a computer system, cause the computer system to at least:
detect an occurrence of a trigger for populating a session cache;
populate the session cache with a plurality of aspects of data as a result of detecting the occurrence of the trigger, an aspect of the plurality of aspects of the data customized for a corresponding service of a plurality of services, the plurality of aspects of the data being associated with a session established with a session service, wherein a first aspect of the plurality of aspects provided in response to a request for data by a first service of the plurality of services is different from a second aspect of the plurality of aspects provided in response to the same request for data by a second service of the plurality of services; and
establish the session with the session service.

13. The non-transitory computer-readable storage medium of claim 12, wherein the instructions that cause the computer system to detect the occurrence of the trigger further include instructions that cause the computer system to receive a request for session creation from a client device that is a party to the session.

14. The non-transitory computer-readable storage medium of claim 12, wherein the instructions that cause the computer system to detect the occurrence of the trigger further include instructions that cause the computer system to receive a request for session creation from an intervening service in communication with a client device that is a party to the session.

15. The non-transitory computer-readable storage medium of claim 12, wherein the trigger is a change to one or more rules used to populate the session cache with the plurality of data aspects.

16. The non-transitory computer-readable storage medium of claim 12, wherein the trigger is based at least in part on a distribution of data received by the session service.

17. The non-transitory computer-readable storage medium of claim 12, wherein the plurality of services make the same application programming interface function call to retrieve, for each service, corresponding plurality of aspects of the data.

18. The non-transitory computer-readable storage medium of claim 12, wherein:
   the instructions further comprise instructions that, when executed by the one or more processors, cause the computer system to receive a request for session data from the service of the plurality of services; and
   the request for session data identifies the session and the service of the plurality of services.

19. The non-transitory computer-readable storage medium of claim 12, wherein the trigger is a session cache miss.

* * * * *